(12) United States Patent  (10) Patent No.: US 8,475,324 B2
Yang  (45) Date of Patent: Jul. 2, 2013

(54) THREE-END SHAFT TYPE DIFFERENTIAL GEAR SET WITH CONTROLLABLE ROTATING DIRECTION AND BRAKE

(76) Inventor: Tai-Her Yang, Dzan-Hwa (TW)

( * ) Notice: Subject to any disclaimer, the term of this patent is extended or adjusted under 35 U.S.C. 154(b) by 0 days.

(21) Appl. No.: 13/086,633

(22) Filed: Apr. 14, 2011

(65) Prior Publication Data

US 2012/0264558 A1   Oct. 18, 2012

(51) Int. Cl.
 *F16H 3/44* (2006.01)
(52) U.S. Cl.
 USPC .......................... 475/324; 475/326
(58) Field of Classification Search
 USPC ............. 475/210, 213, 346; 74/665 F, 665 G, 74/665 GA, 665 GB, 665 GE
 See application file for complete search history.

(56) References Cited

U.S. PATENT DOCUMENTS

| | | | | |
|---|---|---|---|---|
| 4,553,450 A | * | 11/1985 | Gizard | 475/212 |
| 4,804,061 A | * | 2/1989 | Kameda | 180/247 |
| 5,492,189 A | * | 2/1996 | Kriegler et al. | 180/65.23 |
| 6,033,335 A | * | 3/2000 | Hotta et al. | 475/269 |
| 8,257,220 B2 | * | 9/2012 | Yang | 475/287 |
| 8,376,886 B2 | * | 2/2013 | Yang | 475/12 |
| 2003/0181285 A1 | * | 9/2003 | Tanikawa | 475/346 |
| 2011/0039654 A1 | * | 2/2011 | Fox et al. | 475/346 |

* cited by examiner

*Primary Examiner* — Justin Holmes
*Assistant Examiner* — Huan Le
(74) *Attorney, Agent, or Firm* — Bacon & Thomas, PLLC

(57) ABSTRACT

The present invention relates to a speed variable system, and in the first input rotating direction, it is capable of controlling the output shaft to output in normal and reverse rotating directions, and the input shaft is in different speed ratios to the output shaft with respect to the normal and reverse rotation directions.

11 Claims, 4 Drawing Sheets

THREE-END SHAFT TYPE DIFFERENTIAL GEAR SET WITH CONTROLLABLE ROTATING DIRECTION AND BRAKE

BACKGROUND OF THE INVENTION (a) Field of the Invention

The present invention relates to a three-end shaft type differential gear set with controllable rotating direction and brake, wherein the input side of the three-end shaft type differential gear set performing driving in the same input rotating direction, and through controlling a controllable brake device (BK101) and a controllable clutch device (CL101), the output rotating direction at the output side can be in the same rotating direction or in the reverse rotating direction, or in a released state without mutual transmission, or the input side and the output side are both locked in a non-rotary state.

(b) Description of the Prior Art

A conventional speed variable gear system, having the same rotating direction or different rotating direction between the input side and the output side, is often installed with a normal/reverse gear set, and through changing the rotating direction of the gear set, the output in normal rotation or reverse rotation is generated; however, the structure thereof is complicated.

SUMMARY OF THE INVENTION

The present invention provides a three-end shaft type differential gear set with controllable rotating direction and brake, wherein a three-end shaft type differential gear set is combined with a controllable brake device (BK101) and a controllable clutch device (CL101), and when driving the rotation shaft (S101) in the same rotating direction at the input side, through controlling the controllable brake device (BK101) and the controllable clutch device (CL101), the output side is enabled to perform normal or reverse rotation output, or is in a released state without mutual transmission, or the input side and the output side are both locked in a non-rotary state.

DESCRIPTION OF MAIN COMPONENT SYMBOLS (A103)、(A103'): Rocker arm of planetary gear
(AS103)、(AS103'): Sleeve type rotation shaft of planetary gear
(BK101): Controllable brake device
(CL101): Controllable clutch device
(DG101): Planetary gear set
(H100): Housing
(S101)、(S102): Rotation shaft
(W101): Sun wheel
(W102): Outer annular wheel
(W103): Planetary wheel
(A203)、(A203'): Rocker arm of epicycle wheel
(AS203)、(AS203'): Sleeve type rotation shaft of epicycle wheel
(EG201): Epicycle gear set
(W201): Input wheel
(W202): Output wheel
(W203): Epicycle wheel

DETAILED DESCRIPTION OF THE PREFERRED EMBODIMENTS

A conventional speed variable gear system, having the same rotating direction or different rotating direction between the input side and the output side, is often installed with a normal/reverse gear set, and through changing the rotating direction of the gear set, the output in normal rotation or reverse rotation is generated; however, the structure thereof is complicated.

The present invention relates to a three-end shaft type differential gear set with controllable rotating direction and brake, wherein the input side of the three-end shaft type differential gear set performing driving in the same input rotating direction, and through controlling a controllable brake device (BK101) and a controllable clutch device (CL101), the output rotating direction at the output side can be in the same rotating direction or in the reverse rotating direction, or in a released state without mutual transmission, or the input side and the output side are both locked in a non-rotary state.

The present invention provides a three-end shaft type differential gear set with controllable rotating direction and brake, wherein a three-end shaft type differential gear set is combined with a controllable brake device (BK101) and a controllable clutch device (CL101), and when driving the rotation shaft (S101) in the same rotating direction at the input side, through controlling the controllable brake device (BK101) and the controllable clutch device (CL101), the output side is enabled to perform normal or reverse rotation output, or is in a released state without mutual transmission, or the input side and the output side are both locked in a non-rotary state.

Figure 1:
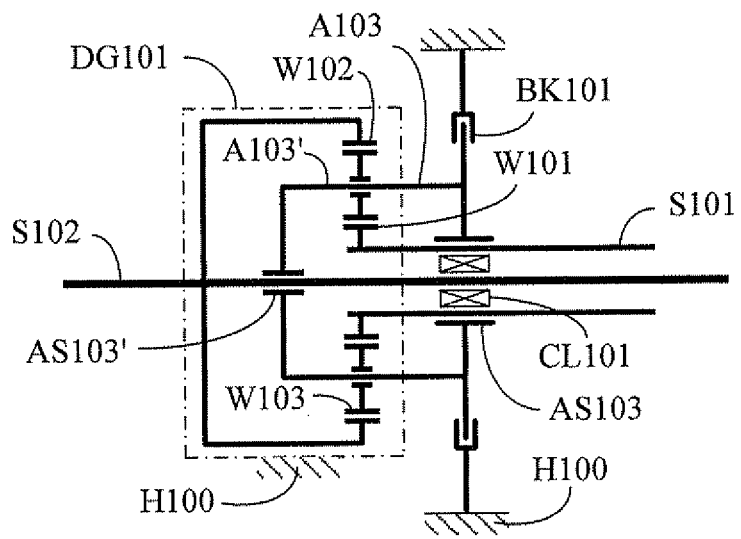
FIG. 1 is a schematic view showing the main structure of the three-end shaft type differential gear set with controllable rotating direction and brake being structured by a planetary gear set, according to one embodiment of the present invention.

According to the three-end shaft type differential gear set with controllable rotating direction and brake, the three-end shaft type differential gear set has three output/input ends for inputting rotation, and the differential transmission coupling is mutually formed between the three, and the conventional structure thereof includes a planetary gear set or an epicycle gear set;

According to the present invention, the three-end shaft type differential gear set with controllable rotating direction and brake structured through a planetary gear set is disclosed as followings:

FIG. 1 is a schematic view showing the main structure of the three-end shaft type differential gear set with controllable rotating direction and brake being structured by a planetary gear set, according to one embodiment of the present invention.

Figure 2:
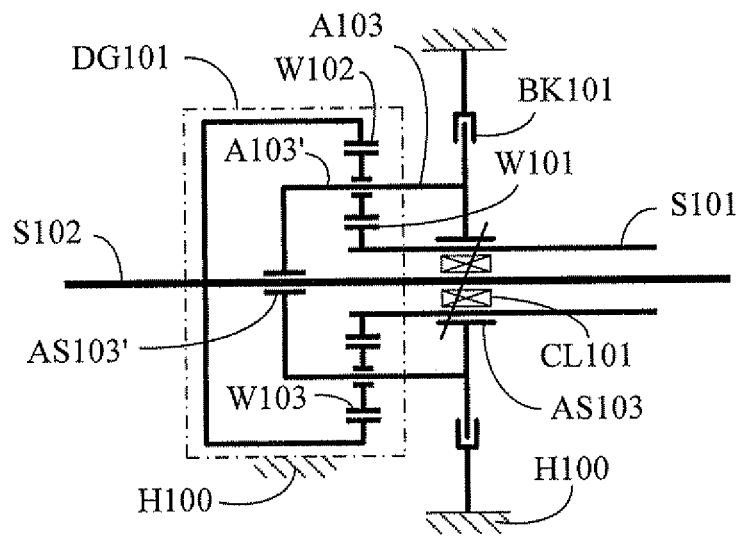
FIG. 2 is a schematic view showing the operation state of the rotation shaft (S101) and the rotation shaft (S102) shown in FIG. 1 performing transmission in the same rotating direction, according to one embodiment of the present invention.

Referring to FIG. 1, a sun wheel (W101) of the planetary gear set (DG 101) is combined with a rotation shaft (S101) for serving as an output/input end, and an outer annular wheel (W102) is combined with a rotation shaft (S102), and a rocker arm of planetary wheel (A103') linked by the planetary wheel (W103) of the planetary gear set (DG101) is rotated and sleeved on the rotation shaft (S102) through a sleeve type rotation shaft of planetary wheel (AS103'), and a rocker arm of planetary wheel (A103) at the other end is rotated and sleeved on the rotation shaft (S101) through a sleeve type rotation shaft of planetary wheel (AS103), and the rocker arm of planetary wheel (A103) or the sleeve type rotation shaft of planetary wheel (AS103) is connected to an action side of a controllable brake device (BK101), and the other action side of the controllable brake device (BK101) is fixed in a housing (H100), and the planetary gear set (DG101) is also fixed in the housing (H100), which mainly consists of:

Planetary gear set (DG101): constituted by a sun wheel (W101) and an outer annular wheel (W102) and at least a planetary wheel (W103), including through gears engaging with each other or through friction wheels mutually performing friction transmissions to form the planetary gear set function, and also constituted including the rotation shaft (S101), the rotation shaft (S102), the rocker arm of planetary wheel (A103), the rocker arm of planetary wheel (AS103'), the sleeve type rotation shaft of planetary wheel (AS103), and the sleeve type rotation shaft of planetary wheel (AS103') and a bearing, for being installed in a shell of the planetary gear set (DG101), and the planetary gear set (DG101) is fixed in the housing (H100);

Rocker arm of planetary wheel (A103): having one end provided for allowing the planetary wheel (W103) to rotate and link, and the other end being sleeved on the rotation shaft (S101) through the sleeve type rotation shaft of planetary wheel (AS103), and the rocker arm of planetary wheel (A103) or the sleeve type rotation shaft of planetary wheel (AS103) is connected to an action side of the controllable brake device (BK101), and the other action side of the controllable brake device (BK101) is fixed in the housing (H100);

Rocker arm of planetary wheel (AS103'): having one end provided for allowing the planetary wheel (W103) to rotate and link, and the other end being rotated and sleeved on the rotation shaft (S102) through the sleeve type rotation shaft of planetary wheel (AS103');

Controllable brake device (BK101): constituted by a brake device controlled by a manual force or mechanical force or hydraulic force or pneumatic force or electromagnetic force, and having action sides for the operations of a brake locking state for engagement or a releasing state for separation, wherein one of the action sides is connected to the sleeve type rotation shaft of planetary wheel (AS103) or the rocker arm of planetary wheel (A103), and the other action side is fixed in the housing (H100);

Controllable clutch device (CL101): constituted by a controllable clutch device or a centrifugal clutch device driven by a manual force or mechanical force or hydraulic force or pneumatic force or electromagnetic force, and installed between the rotation shaft (S101) and the rotation shaft (S102) for performing operations of engagement or disengagement;

The sun wheel (W101) of the planetary gear set (DG101) is combined with the rotation shaft (S101) for serving as an output/input end, the rocker arm of planetary wheel (A103) and the sleeve type rotation shaft of planetary wheel (AS103) linked by the planetary wheel (W103) of the planetary gear set (DG101) are rotated and sleeved on the rotation shaft (S101), and the mentioned rocker arm of planetary wheel (A103) and the sleeve type rotation shaft of planetary wheel (AS103) is connected to an action side of the controllable brake device (BK101), and the other action side of the controllable brake device (BK101) is fixed in the housing (H100);

The outer annular wheel (W102) is combined with the rotation shaft (S102) and coupled with the planetary wheel (W103) for transmission, and the rocker arm of planetary wheel (A103') linked by the other end of the planetary wheel (W103) of the planetary gear set (DG101) is provided for driving the sleeve type rotation shaft of planetary wheel (AS103'), and the rocker arm of planetary wheel (AS103') is rotated and sleeved on the rotation shaft (S102);

The sun wheel (W101) is connected to the rotation shaft (S101) and coupled with the planetary wheel (W103) for transmission;

The operations of the three-end shaft type differential gear set with controllable rotating direction and brake as shown in FIG. 1 includes one or more than one of following functions:

FIG. 2 is a schematic view showing the operation state of the rotation shaft (S101) and the rotation shaft (S102) shown in FIG. 1 performing transmission in the same rotating direction, according to one embodiment of the present invention.

Figure 3:
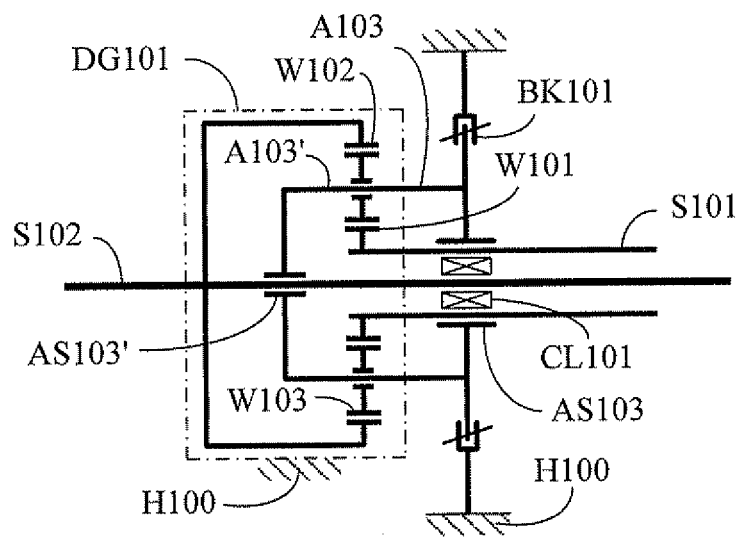
FIG. 3 is a schematic view showing the operation state of the rotation shaft (S101) and the rotation shaft (S102) shown in FIG. 1 performing transmission in different rotating directions, according to one embodiment of the present invention.

As shown in FIG. 2, the operation state is as following:

When the controllable brake device (BK101) is in the releasing state and the controllable clutch device (CL101) is in the engaging state, the rotation shaft (S101) and the rotation shaft (S102) are in the engaging state for performing the transmission in the same rotating direction;

FIG. 3 is a schematic view showing the operation state of the rotation shaft (S101) and the rotation shaft (S102) shown in FIG. 1 performing transmission in different rotating directions, according to one embodiment of the present invention.

Figure 4:
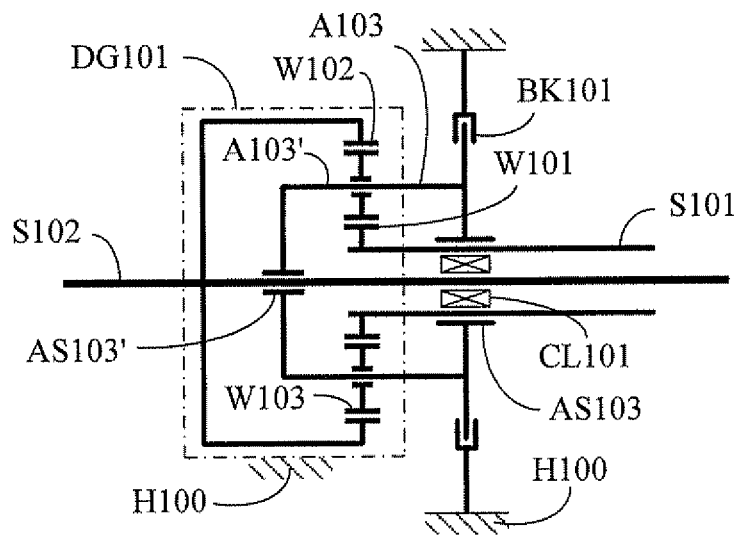
FIG. 4 is a schematic view showing the operation state of the rotation shaft (S101) and the rotation shaft (S102) shown in FIG. 1 being released with no mutual transmission, according to one embodiment of the present invention.

As shown in FIG. 3, the operation state is as following:

When the controllable brake device (BK101) is in the brake locking state and the controllable clutch device (CL101) is in the releasing state, the transmission relation of the rotation shaft (S101) and the rotation shaft (S102) is the transmission function in the reverse rotating directions;

FIG. 4 is a schematic view showing the operation state of the rotation shaft (S101) and the rotation shaft (S102) shown in FIG. 1 being released with no mutual transmission, according to one embodiment of the present invention.

As shown in FIG. 4, the operation state is as following:

When the controllable brake device (BK101) is in the releasing state and the controllable clutch device (CL101) is in the releasing state, the rotation shaft (S101) and the rotation shaft (S102) are released with no mutual transmission.

Figure 5:
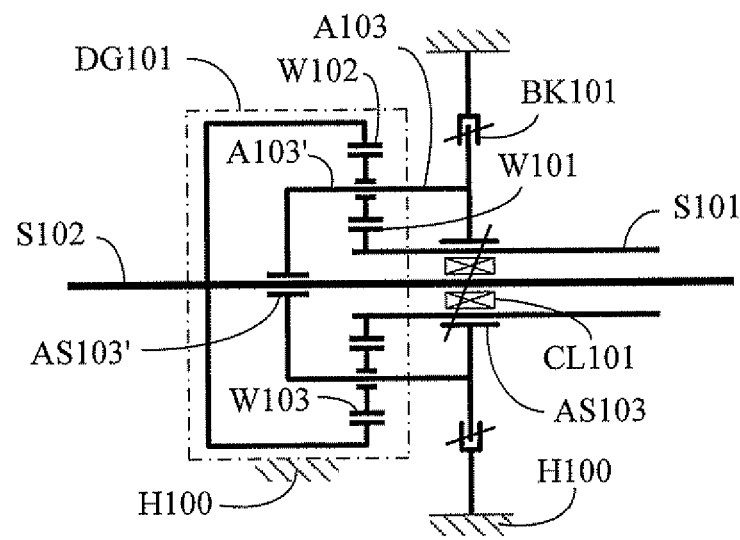
FIG. 5 is a schematic view showing the operation state of the rotation shaft (S101) and the rotation shaft (S102) shown in FIG. 1 being locked, according to one embodiment of the present invention.

FIG. 5 is a schematic view showing the operation state of the rotation shaft (S101) and the rotation shaft (S102) shown in FIG. 1 being locked, according to one embodiment of the present invention.

As shown in FIG. 5, the operation state is as following:

When the controllable brake device (BK101) is in the brake locking state and the controllable clutch device (CL101) is in the engaging state, the rotation shaft (S101) and the rotation shaft (S102) are locked.

Figure 6:
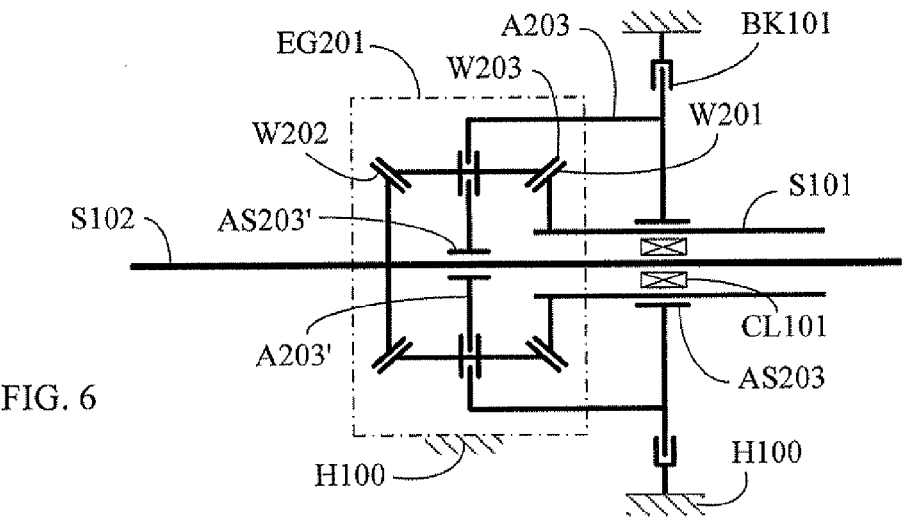
FIG. 6 is a schematic view showing the main structure of the three-end shaft type differential gear set with controllable rotating direction and brake being structured by an epicycle gear set, according to one embodiment of the present invention.

According to the three-end shaft type differential gear set with controllable rotating direction and brake of the present invention, the three-end shaft type differential gear set has three output/input ends for inputting rotation, and the differential transmission coupling is mutually formed between the three, and the conventional structure thereof includes a planetary gear set or an epicycle gear set;

According to the present invention, the three-end shaft type differential gear set with controllable rotating direction and brake structured through an epicycle gear set is disclosed as followings:

FIG. 6 is a schematic view showing the main structure of the three-end shaft type differential gear set with controllable rotating direction and brake being structured by an epicycle gear set, according to one embodiment of the present invention.

Figure 7:
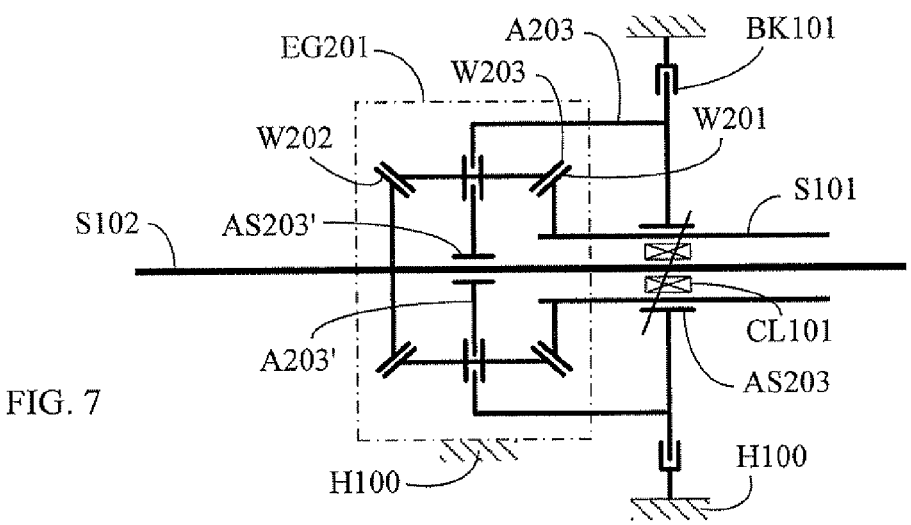
FIG. 7 is a schematic view showing the operation state of the rotation shaft (S101) and the rotation shaft (S102) shown in FIG. 6 performing transmission in the same rotating direction, according to one embodiment of the present invention.

Referring to FIG. 6, an input wheel (W201) of the epicycle gear set (EG201) is connected to the rotation shaft (S101) for being served as an output/input end, and an output wheel (W202) is combined with the rotation shaft (S102), a rocker arm of epicycle wheel (A203') linked by an epicycle wheel (W203) of the epicycle gear set (EG201) is rotated and sleeved on the rotation shaft (S102) through a sleeve type rotation shaft of epicycle wheel (AS203'), and an rocker arm of epicycle wheel (A203) at the other end is rotated and sleeved on the rotation shaft (S101) through a sleeve type rotation shaft of epicycle wheel (AS203), and the rocker arm of epicycle wheel (A203) or the sleeve type rotation shaft of epicycle wheel (AS203) is connected to an action side of the controllable brake device (BK101), and the other action side of the controllable brake device (BK101) is fixed in the housing (H100), and the epicycle gear set (EG201) is also fixed in the housing (H100); which mainly consists of:

Epicycle gear set (EG201): constituted by an input wheel (W201) and an output wheel (W202) and at least an epicycle wheel (W203), and including through bevel gears engaging with each other or through bevel friction wheels mutually performing friction transmissions to form the epicycle gear set function, and also constituted including the rotation shaft (S101), the rotation shaft (S102), the rocker arm of epicycle wheel (A203), the rocker arm of epicycle wheel (A203'), the sleeve type rotation shaft of epicycle wheel (AS203), the sleeve type rotation shaft of epicycle wheel (AS203') and a bearing, for being installed in a shell of the epicycle gear set (EG201), and the epicycle gear set (EG201) is fixed in the housing (H100); the speed ratio of the mentioned rotation shaft (S101) and the rotation shaft (S102) can be the same or different;

Rocker arm of epicycle wheel (A203): having one end provided for allowing the epicycle wheel (W203) to rotate and link, and the other end being sleeved on the rotation shaft (S101) through the sleeve type rotation shaft of epicycle wheel (AS203), the rocker arm of epicycle wheel (A203) or the sleeve type rotation shaft of epicycle wheel (AS203) is connected to an action side of the controllable brake device (BK101), and the other action side of the controllable brake device (BK101) is fixed in the housing (H100);

Rocker arm of epicycle wheel (A203'): having one end provided for allowing the epicycle wheel (W203) to rotate and link, and the other end being rotated and sleeved on the rotation shaft (S102) through the sleeve type rotation shaft of epicycle wheel (AS203');

Controllable brake device (BK101): constituted by a brake device controlled by a manual force or mechanical force or hydraulic force or pneumatic force or electromagnetic force, and having action sides for the operations of a brake locking state for engagement or a releasing state for separation, wherein one of the action sides is connected to the sleeve type rotation shaft of epicycle wheel (AS203) or the rocker arm of epicycle wheel (A203), and the other action side is fixed in the housing (H100);

Controllable clutch device (CL101): constituted by a controllable clutch device or a centrifugal clutch device driven by a manual force or mechanical force or hydraulic force or pneumatic force or electromagnetic force, and installed between the rotation shaft (S101) and the rotation shaft (S102) for performing operations of engagement or disengagement;

The input wheel (W201) of the epicycle gear set (EG201) is connected to the rotation shaft (S101) for serving as an output/input end, the rocker arm of epicycle wheel (A203) and the sleeve type rotation shaft of epicycle wheel (AS203) linked by the epicycle wheel (W203) of the epicycle gear set (EG201) are rotated and sleeved on the rotation shaft (S101), and the mentioned rocker arm of epicycle wheel (A203) or the sleeve type rotation shaft of epicycle wheel (AS203) is connected to an action side of the controllable brake device (BK101), and the other action side of the controllable brake device (BK101) is fixed in the housing (H100);

The output wheel (W202) is connected to the rotation shaft (S102) and coupled with the epicycle wheel (W203) for transmission, and the rocker arm of epicycle wheel (A203') linked at the other end of the epicycle wheel (W203) of the epicycle gear set (EG201) is provided for driving the sleeve type rotation shaft of epicycle wheel (AS203'), and the rocker arm of epicycle wheel (A203') is rotated and sleeved on the rotation shaft (S102);

The input wheel (W201) is connected to the rotation shaft (S101) and coupled with the epicycle wheel (W203) for transmission;

The operations of the three-end shaft type differential gear set with controllable rotating direction and brake as shown in FIG. 6 include one or more than one of following functions:

FIG. 7 is a schematic view showing the operation state of the rotation shaft (S101) and the rotation shaft (S102) shown in FIG. 6 performing transmission in the same rotating direction, according to one embodiment of the present invention.

Figure 8:
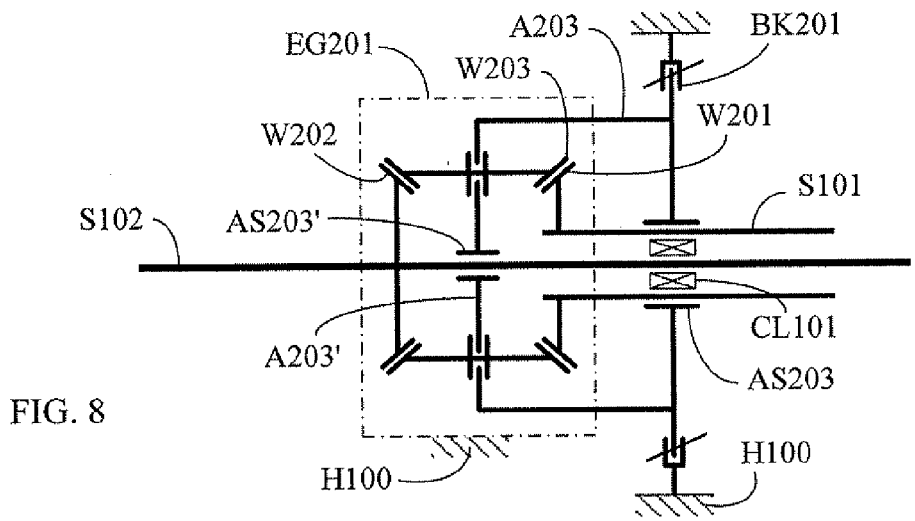
FIG. 8 is a schematic view showing the operation state of the rotation shaft (S101) and the rotation shaft (S102) shown in FIG. 6 performing transmission in different rotating directions, according to one embodiment of the present invention.

As shown in FIG. 7, the operation state is as following:

When the controllable brake device (BK101) is in the releasing state and the controllable clutch device (CL101) is in the engaging state, the rotation shaft (S101) and the rotation shaft (S102) are in the engaging state for performing the transmission in the same rotating direction;

FIG. 8 is a schematic view showing the operation state of the rotation shaft (S101) and the rotation shaft (S102) shown in FIG. 6 performing transmission in different rotating directions, according to one embodiment of the present invention.

Figure 9:
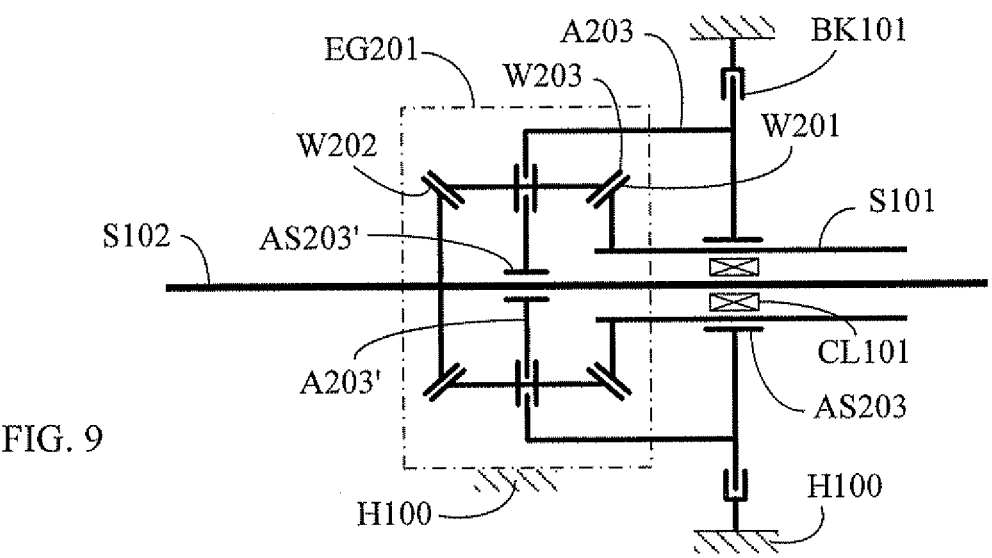
FIG. 9 is a schematic view showing the operation state of the rotation shaft (S101) and the rotation shaft (S102) shown in FIG. 6 being released with no mutual transmission, according to one embodiment of the present invention.

As shown in FIG. 8, the operation state is as following:

When the controllable brake device (BK101) is in the brake locking state and the controllable clutch device (CL101) is in the releasing state, the transmission relation of the rotation shaft (S101) and the rotation shaft (S102) is the transmission function in the reverse rotating directions;

FIG. 9 is a schematic view showing the operation state of the rotation shaft (S101) and the rotation shaft (S102) shown in FIG. 6 being released with no mutual transmission, according to one embodiment of the present invention.

As shown in FIG. 9, the operation state is as following:

When the controllable brake device (BK101) is in the releasing state and the controllable clutch device (CL101) is in the releasing state, the rotation shaft (S101) and the rotation shaft (S102) are released with no mutual transmission.

Figure 10:
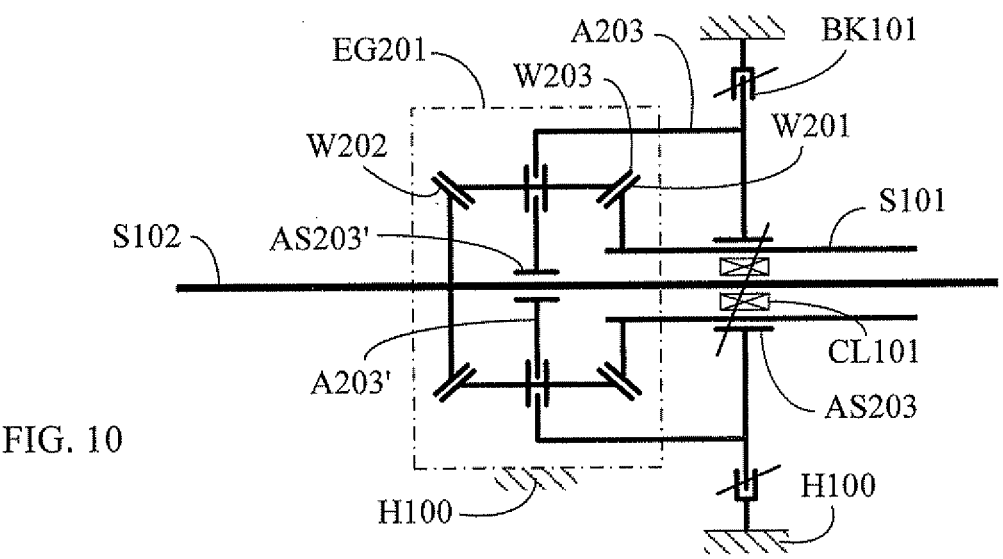
FIG. 10 is a schematic view showing the operation state of the rotation shaft (S101) and the rotation shaft (S102) shown in FIG. 6 being locked, according to one embodiment of the present invention.

FIG. 10 is a schematic view showing the operation state of the rotation shaft (S101) and the rotation shaft (S102) shown in FIG. 6 being locked, according to one embodiment of the present invention.

As shown in FIG. 10, the operation state is as following:

When the controllable brake device (BK101) is in the brake locking state and the controllable clutch device (CL101) is in the engaging state, the rotation shaft (S101) and the rotation shaft (S102) are in the locked state.

The invention claimed is:

1. A three-end shaft type differential gear set with a controllable rotating direction, comprising:
   a first input/output shaft (S101) and a second input/output shaft (S102);
   a controllable brake device (BK101); and
   a controllable clutch device (CL101) between the second input/output shaft (S102) and the first input/output shaft (S101) for controllably coupling the second input/output shaft (S102) to the first input/output shaft (S101),
   wherein the first input/output shaft (S101) has a sleeve shape and coaxially surrounds a part of the second input/output shaft (S102), and
   wherein the controllable brake device (BK101) and the controllable clutch device (CL101) are controllable to cause the following relationships between the second input/output shaft (S102) and the first input/output shaft (S101):
   the rotating direction of the first input/output shaft (S101) is the same as or different from the rotating the direction of the second input/output shaft (S102), the second input/output shaft (S102) and the first input/output shaft (S101) to be in a released state without mutual transmission, and the second input/output shaft (S102) and the first input/output shaft (S101) to be locked in a non-rotating state.

2. A three-end shaft type differential gear set with a controllable rotating direction as claimed in claim 1, further comprising a planetary gear set (DG101) within a housing (H100), said planetary gear set including:
   a sun wheel (W101) connected to and rotatable with the first input/output shaft (S101);
   at least one planetary wheel (W103) engaged with the sun wheel (W101);
   an outer annular wheel (W102) connected to and rotatable with the second input/output shaft (S102) and engaged with the at least one planetary wheel (W103); and
   one of a rocker arm (A103) and planetary wheel shaft (A103') to which the at least one planetary wheel (W103) is rotatably mounted, a first end of said rocker arm (A103) or planetary gear shaft (A103') including or being attached to a first sleeve (AS103) through which the first input/output shaft (S101) rotatably extends, and a second end of said rocker arm (A103) or planetary gear shaft (A103') including a second sleeve (AS103') through which the second input/output shaft (S102) rotatably extends,
   wherein said controllable brake device (BK101) is controllable by one of manual, mechanical, hydraulic, pneumatic, and electromagnetic force to cause a first side of the controllable brake device (BK101) to engage and disengage the rocker arm (A103) or planetary gear shaft (A103'), a second side of the controllable brake device (BK101) being fixed to the housing (H100), and
   wherein said controllable clutch device (CL101) is controllable by one of manual, mechanical, hydraulic, pneumatic, and electromagnetic force to releasably couple the second input/output shaft (S102) to the first input/output shaft (S101).

3. A three-end shaft type differential gear set with a controllable rotating direction as claimed in claim 2, wherein when the controllable brake device (BK101) is in a released state and the controllable clutch device is in an engaged state, the second input/output shaft (S102) and the first input/output shaft (S101) perform transmission in a same rotating direction.

4. A three-end shaft type differential gear set with a controllable rotating direction as claimed in claim 2, wherein when the controllable brake device (BK101) is in a brake locking state and the controllable clutch device is in a released state, the second input/output shaft (S102) and the first input/output shaft (S101) perform transmission in different rotating directions.

5. A three-end shaft type differential gear set with a controllable rotating direction as claimed in claim 2, wherein when the controllable brake device (BK101) is in released state and the controllable clutch device is in a released state, the second input/output shaft (S102) and the first input/output shaft (S101) are released with no mutual transmission.

6. A three-end shaft type differential gear set with a controllable rotating direction as claimed in claim 2, when the controllable brake device (BK101) is in a brake locking state and the controllable clutch device is in an engaged state, the second input/output shaft (S102) and the first input/output shaft (S101) are locked.

7. A three-end shaft type differential gear set with a controllable rotating direction as claimed in claim 1, further comprising an epicyclic gear set (EG201) within a housing (H100), said epicyclic gear set including:
   an input wheel (W201) connected to and rotatable with the first input/first input/output shaft (S101);
   at least one epicyclic wheel (W203) engaged with the input wheel (W201);
   an output wheel (W202) connected to and rotatable with the second input/output shaft (S102) and engaged with the at least one epicyclic wheel (W203); and
   a rocker arm (A203) to which the at least one epicyclic wheel (W203) is rotatably mounted, an end of said rocker arm (A203) including or being attached to a sleeve (AS203) through which the first input/output shaft (S101) rotatably extends, and a second end of said rocker arm (A203) including a second sleeve (AS203') through which the second input/output shaft (S102) rotatably extends, wherein said controllable brake device (BK101) is controllable by one of manual, mechanical, hydraulic, pneumatic, and electromagnetic force to cause a first side of the controllable brake device (BK101) to engage and disengage the rocker arm (A203), a second side of the controllable brake device (BK101) being fixed to the housing (H100), and wherein said controllable clutch device (CL101) is controllable by one of manual, mechanical, hydraulic, pneumatic, and electromagnetic force to releasably couple the second input/output shaft (S102) to the first input/output shaft (S101).

8. A three-end shaft type differential gear set with a controllable rotating direction as claimed in claim 7, wherein when the controllable brake device (BK101) is in a released state and the controllable clutch device is in an engaged state, the second input/output shaft (S102) and the first input/output shaft (S101) perform transmission in a same rotating direction.

9. A three-end shaft type differential gear set with a controllable rotating direction as claimed in claim 7, wherein when the controllable brake device (BK101) is in a brake locking state and the controllable clutch device is in a released state, the input shaft (S102) and the output shaft (S101) perform transmission in different rotating directions.

10. A three-end shaft type differential gear set with a controllable rotating direction as claimed in claim 7, wherein when the controllable brake device (BK101) is in released state and the controllable clutch device is in a released state, the second input/output shaft (S102) and the first input/output shaft (S101) are released with no mutual transmission.

11. A three-end shaft type differential gear set with a controllable rotating direction as claimed in claim 7, when the controllable brake device (BK101) is in a brake locking state and the controllable clutch device is in an engaged state, the input shaft (S102) and the output shaft (S101) are locked.

\* \* \* \* \*